United States Patent
Schön (10) Patent No.: US 11,485,366 B2
(45) Date of Patent: Nov. 1, 2022

(54) METHOD FOR OPERATING A MOTOR VEHICLE WITH THE HELP OF VITAL PHYSIOLOGICAL DATA, MOTOR VEHICLE AND MOBILE TERMINAL DEVICE

(71) Applicant: Audi AG, Ingolstadt (DE)

(72) Inventor: Torsten Schön, Pietenfeld (DE)

(73) Assignee: Audi AG, Ingolstadt (DE)

( * ) Notice: Subject to any disclaimer, the term of this patent is extended or adjusted under 35 U.S.C. 154(b) by 487 days.

(21) Appl. No.: 16/336,770

(22) PCT Filed: Sep. 19, 2017

(86) PCT No.: PCT/EP2017/073529
§ 371 (c)(1),
(2) Date: Mar. 26, 2019

(87) PCT Pub. No.: WO2018/059995
PCT Pub. Date: Apr. 5, 2018

(65) Prior Publication Data
US 2021/0213956 A1    Jul. 15, 2021

(30) Foreign Application Priority Data
Sep. 29, 2016   (DE) .......................... 102016218877.1

(51) Int. Cl.
*B60W 40/08*        (2012.01)
*B60W 50/00*        (2006.01)
(Continued)

(52) U.S. Cl.
CPC ........ *B60W 40/08* (2013.01); *B60W 50/0098* (2013.01); *B60W 50/14* (2013.01);
(Continued)

(58) Field of Classification Search
CPC .. B60W 40/08; B60W 50/0098; B60W 50/14; B60W 2540/221;
(Continued)

(56) References Cited

U.S. PATENT DOCUMENTS 5,172,785 A  * 12/1992  Takahashi ................. B60T 7/12
                                                        706/900
6,392,550 B1 *  5/2002  Najor ....................... A61B 5/18
                                                        340/576
(Continued)

FOREIGN PATENT DOCUMENTS

CN        103948394 A      7/2014
CN        104802801 A      7/2015
(Continued)

OTHER PUBLICATIONS

International Preliminary Report on Patentability directed to related International Patent Application No. PCT/EP2017/073529, dated Apr. 2, 2019, with attached English language translation; 16 pages.
(Continued)

*Primary Examiner* — Babar Sarwar
(74) *Attorney, Agent, or Firm* — Sterne, Kessler, Goldstein & Fox P.L.L.C.

(57) ABSTRACT

A method is disclosed for operating a motor vehicle, wherein a control device determines a first index value from vital physiological data received from a sensor device at a first point in time. The control device generates a first actuator signal describing the activation of first actuator function, to be carried out by a first actuator that is selected based on the first index value. At a second point in time, the sensor device records additional vital physiological data and identifies a second index value. Both index values, each describing a physiological state of the user, are compared, and the result is used to determine whether the second index value meets an efficacy criterion that describes a predetermined degree of (Continued)

improvement in the physiological state brought about by the activated actuator function. If the second index value meets the efficacy criterion, the first actuator function is activated as soon as an index value is identified that describes the same physiological state.

21 Claims, 3 Drawing Sheets (51) Int. Cl.
B60W 50/14 (2020.01)
G06F 1/16 (2006.01)
(52) U.S. Cl.
CPC ..... *G06F 1/163* (2013.01); *B60W 2040/0809* (2013.01); *B60W 2040/0872* (2013.01); *B60W 2050/0075* (2013.01); *B60W 2050/0088* (2013.01); *B60W 2050/146* (2013.01); *B60W 2540/221* (2020.02); *B60W 2556/10* (2020.02)
(58) Field of Classification Search
CPC . B60W 2040/0809; B60W 2040/0872; B60W 2050/0088; B60W 2050/0089; B60W 2050/146; B60W 2540/0088; B60W 2050/221; G06F 1/163
See application file for complete search history.

(56) References Cited

U.S. PATENT DOCUMENTS

| | | | | |
|---|---|---|---|---|
| 6,906,619 | B2 * | 6/2005 | Williams | B60Q 1/52 340/439 |
| 7,609,150 | B2 * | 10/2009 | Wheatley | B60W 50/0097 340/439 |
| 7,609,168 | B2 * | 10/2009 | Boverie | A61B 5/11 340/576 |
| 8,339,268 | B2 * | 12/2012 | Deng | G08B 21/06 455/418 |
| 8,483,909 | B2 * | 7/2013 | Visconti | B60W 40/09 340/576 |
| 9,292,471 | B2 * | 3/2016 | Fung | A61B 5/18 |
| 9,610,908 | B2 | 4/2017 | Siegel et al. | |
| 9,688,271 | B2 * | 6/2017 | Chan | A61B 5/11 |
| 9,925,841 | B2 * | 3/2018 | Hrovat | B60G 17/0165 |
| 10,278,634 | B2 * | 5/2019 | Cogill | G01C 21/3484 |
| 10,709,386 | B2 * | 7/2020 | Gallagher | A61B 5/0205 |
| 10,752,252 | B2 * | 8/2020 | Fung | G07C 9/37 |
| 2003/0153846 | A1 * | 8/2003 | Marple-Horvat | A61B 5/18 600/587 |
| 2005/0030184 | A1 * | 2/2005 | Victor | B60K 35/00 340/576 |
| 2005/0148894 | A1 * | 7/2005 | Misczynski | A61B 5/02405 600/513 |
| 2006/0235753 | A1 * | 10/2006 | Kameyama | G06Q 30/0201 705/15 |
| 2011/0213511 | A1 * | 9/2011 | Visconti | B60W 40/09 701/1 |
| 2014/0135598 | A1 | 5/2014 | Weidl et al. | |
| 2014/0240132 | A1 * | 8/2014 | Bychkov | A61B 5/18 340/576 |
| 2015/0191178 | A1 | 7/2015 | Roy et al. | |
| 2015/0307105 | A1 | 10/2015 | Huber | |
| 2017/0120929 | A1 * | 5/2017 | Siddiqui | B60W 40/08 |
| 2018/0253094 | A1 * | 9/2018 | Chang | G05D 1/0055 |
| 2019/0061772 | A1 * | 2/2019 | Prinz | A61B 5/02055 |

FOREIGN PATENT DOCUMENTS

| | | |
|---|---|---|
| CN | 105015445 A | 11/2015 |
| DE | 102011109564 A1 | 2/2013 |
| DE | 102011112371 A1 | 3/2013 |
| DE | 102014019158 B3 | 4/2016 |
| DE | 102015105581 A1 | 5/2016 |
| EP | 2711226 A1 | 3/2014 |
| GB | 2528083 A | 1/2016 |
| KR | 20160049250 A | 5/2016 |

OTHER PUBLICATIONS

International Search Report and Written Opinion of the International Searching Authority directed to related International Patent Application No. PCT/EP2017/073529, dated Dec. 15, 2017, with attached English-language translation; 19 pages.

* cited by examiner

Fig.1

Fig.2

METHOD FOR OPERATING A MOTOR VEHICLE WITH THE HELP OF VITAL PHYSIOLOGICAL DATA, MOTOR VEHICLE AND MOBILE TERMINAL DEVICE

TECHNICAL FIELD

This disclosure relates to a method for operating a motor vehicle. A sensor device for receiving vital physiological data about a user receives the vital physiological data, for example a pulse or a heart rate, which is used to determine an index value that describes a physiological parameter. An actuator of the motor vehicle can then be controlled on the basis of the index value.

BACKGROUND

Since being developed, "wearables," i.e., wearable accessories that can record vital physiological data, are becoming increasingly used in motor vehicles. Such a "wearable" comprises a sensor device for this purpose, which can comprise a pulse sensor or a breathing sensor, for example.

DE 10 2015 105 581 A1 describes a method for monitoring the health of a passenger. Physiological parameters can be used to deduce the passenger's health or state of health or to deduce anything abnormal. The user can be informed about his health via a screen of the motor vehicle.

EP 2711 226 A1 discloses a method comprising a corresponding system, which can be used to measure physiological properties of a driver and to adapt the clutch control.

DE 10 2011 112 371 A1 describes an apparatus for setting at least one operating parameter of a motor vehicle system in order to relax a driver.

However, the method from the prior art is disadvantageous in that the user himself has no influence over what measures he would like in order to improve his physiological state.

BRIEF DESCRIPTION OF THE DRAWINGS/FIGURES

The accompanying drawings, which are incorporated herein and form part of the specification, illustrate the present embodiments and, together with the description, further serve to explain the principles of the present embodiments and to enable a person skilled in the relevant art(s) to make and use the present embodiments.

The features and advantages of the present embodiments will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

One problem addressed by this disclosure is the provision of a user-specific measure for improving a physiological state of the user.

The problem addressed is solved by the method and the devices in the independent claims. Advantageous developments are given in the dependent claims.

This disclosure is based on the concept of determining an index value from vital physiological data about the user at two different points in time, each index value describing a physiological state of the user. The concept of this disclosure shall determine whether an actuator of the motor vehicle, which is activated in order to improve a first physiological state of the user, effectively improves the physiological state. The motor vehicle can therefore "learn" whether or not a function of the actuator, referred to as an actuator function in the following, helps the user. This thus reduces stress more effectively and therefore also provides better customer satisfaction.

The method according to the disclosed embodiments for operating a motor vehicle comprises the method step of determining, by a control device, a first index value from vital physiological data that is recorded by a sensor device at a first point in time, the vital physiological data being received from the sensor device and the vital physiological data describing a physiological parameter relating to a user of the motor vehicle, for example a pulse or a breathing rate. In this case, an index value is a value that describes a physiological state of the user, for example a state of stress or a state of exhaustion.

The sensor device is understood to be a device or a device component that is designed to receive chemical or physical properties or any other properties of the surrounding area and comprises at least one sensor for this purpose. In the present case, the sensor device is designed to receive the vital physiological data about the user and can comprise a pulse sensor or a sensor that senses electrical conductivity, for example. In this case, the sensor device can be a component of the motor vehicle or can be integrated in a wearable accessory, for example, in a so-called "wearable." The physiological parameter is then a pulse, a heartbeat, or a breathing rate, for example.

A first actuator of the motor vehicle is selected from a plurality of actuators on the basis of the first index value. The control device is understood to be a device or device component, which is designed to transmit signals and to generate control signals, and can comprise a microcontroller and/or a microprocessor, for example, for this purpose. The control device can be designed as a control device for the motor vehicle, for example, which can send corresponding activation signals to the particular actuator of the motor vehicle.

The control device generates a first actuator signal, which describes the activation of a first actuator function that is to be carried out by the first actuator, and the first actuator signal is likewise transmitted to the first actuator. For example, the control device can generate an activation signal, which can activate a massage function of a motor vehicle seat, for example.

The method according to some embodiments is characterized in that vital physiological data is recorded once again by means of the sensor device at a second point in time, in other words at a point in time after the first actuator function has been activated, and the control device determines a second index value on the basis of this vital physiological data. The two index values (e.g., first index value and second index value) are compared, each index value describing the physiological state of the user at a different point in time.

The result of the comparison is used to determine whether the second index value meets an efficacy criterion, which describes a predetermined degree of improvement in the physiological state brought about by the activated actuator function. In this case, the efficacy criterion can be a threshold value stored in the control device, for example, and/or the efficacy criterion can prescribe that a state of stress is intended to be reduced by a predetermined degree in order to physiologically improve the state, for example. If the second index value meets the efficacy criterion, the first actuator function is activated once an index value that describes the physiological state has been identified at another point in time. In other words, the first actuator function is activated once the user is back in the motor vehicle and in a state of stress at a later point in time.

This is especially effective at reducing stress and therefore also increasing customer satisfaction. Since the physiological state can be improved and the wellbeing of the user can be influenced in a positive way, the method according to some embodiments also leads to improved driving safety.

The control device can optionally be provided a "machine learning model" from the index values received and/or the result of the comparison, which model can describe the index values and the efficiency of the first actuator function or plurality of actuator functions. Using such a model, if a physiological state is present, for example, it is then possible to read which actuator function is the most efficient for the user. In other words, such a "machine learning model" can "learn" individual preferences of the user with regard to the available actuator functions of the motor vehicle. In situations in which the user is back in the physiological state, the model, by way of example, can activate the measure that has proven to be particularly efficient in the past as the preferred measure for improving the physiological state. By means of the method according to some embodiments, the motor vehicle can therefore advantageously "learn" the user's individual needs.

For this purpose, according to another embodiment of the method, if the second index value does not meet the efficacy criterion, a second actuator function of the first actuator or of a different actuator of the motor vehicle can be selected, and a second actuator signal is generated, which describes the activation of the second actuator function selected, and the second actuator signal is transmitted to the corresponding actuator.

The control device can then determine a third index value from vital physiological data that is recorded at a third point in time, and use the third index value and at least one of the other index values to determine whether the third index value meets the efficacy criterion and/or whether the second actuator function brings about a greater degree of improvement than the first actuator function. If the second actuator function brings about a greater degree of improvement, the second actuator function can be activated once another index value that describes the physiological state has been identified.

The method can be tailored to the specific user if, according to another embodiment of the method, the control device establishes the identity of the user, provides an assignment rule by assigning a plurality of actuator functions to one physiological state in each case, and personalizes the assignment rule on the basis of the identity established. It is hereby possible to store a person-specific wellness program in the motor vehicle, for example.

According to one development, the identity of the user can be identified on the basis of a user profile that is stored on a data server that is located outside of the motor vehicle. The person-specific measures can therefore be advantageously provided automatically, for example, if the current user logs into the system of the motor vehicle before travelling, for example.

As already mentioned above, the sensor device can preferably be designed as a sensor device of a wearable accessory, which is designed to be worn on the user's body. Such a design can be a fitness wristband, for example, or a piece of clothing comprising a corresponding sensor device, a wristband or a watch. Such designs are everyday accessories and the use of such a "wearable" means the user is not compelled to put on a special device during a car journey. In addition, such accessories are compatible with the motor vehicle; the user can therefore change the object comprising the sensor device on a daily basis. In addition, the vital physiological data is recorded separately from the motor vehicle, for which reason the motor vehicle is less expensive to manufacture and does not have to be retrofitted with a sensor device.

The particular actuator function can preferably be selected from one of the following actuator actions: activating a massage function by means of a motor vehicle seat and/or playing an audio file, preferably an audio file stored in an infotainment system of the motor vehicle, and/or playing a predetermined music genre and/or setting the lighting by means of a lighting device of the motor vehicle and/or displaying a stop recommendation by means of a screen of the motor vehicle. These measures constitute particularly efficient measures and can be carried out by devices of the motor vehicle.

The above-stated problem is likewise solved by a control device, which can preferably comprise a microcontroller and/or a microchip, the control device being designed to carry out the method steps of a method according to the embodiments illustrated above that relate to a control device. This results in the above-mentioned advantages.

The above-mentioned advantages are likewise achieved by a motor vehicle having a control device according to the disclosed embodiments. The motor vehicle can preferably be designed as a car, for example, as a passenger car.

The above-stated problem is also solved by a storage medium comprising a program code that is designed to carry out the disclosed method when executed by a control device of a mobile terminal device. In this case, the program code can provide a "machine learning model," for example. When the method is carried out, such a model can then learn individual preferences of the user and, in situations in which the user is back in the physiological state, can therefore activate the measures that have proven to be particularly efficient in the past in order to improve the physiological state.

The above-mentioned advantages are likewise achieved by a mobile terminal device comprising a storage medium and/or a control device, according to the disclosed embodiments.

Figure 1:
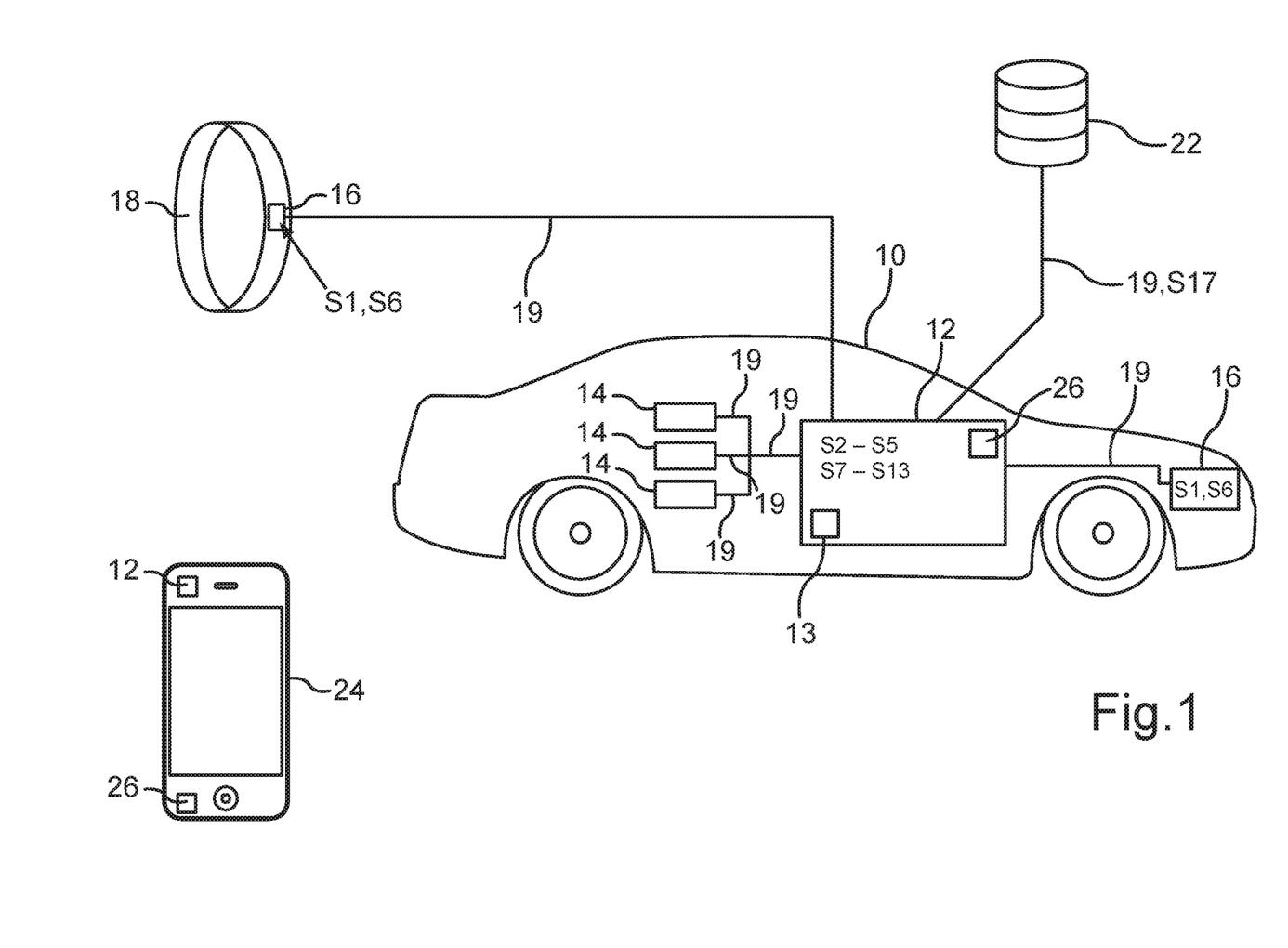
FIG. 1 illustrates a schematic view of a first embodiment of the disclosed method using an embodiment of a motor vehicle.

This disclosure will be explained once again in more detail on the basis of the accompanying drawings and by means of specific embodiments. The embodiments explained in the following are preferred embodiments. In the embodiments, however, each of the components described therein represents individual features that are to be viewed independently of one another and can therefore be considered as a component in isolation or in a different combination to that shown. Furthermore, additional features that have already been described can also be added to the embodiments described. Elements having the same function have the same reference labels in the figures, in which:

FIG. 1 is a schematic view of a first embodiment of the disclosed method using an embodiment of a motor vehicle.

Figure 2:
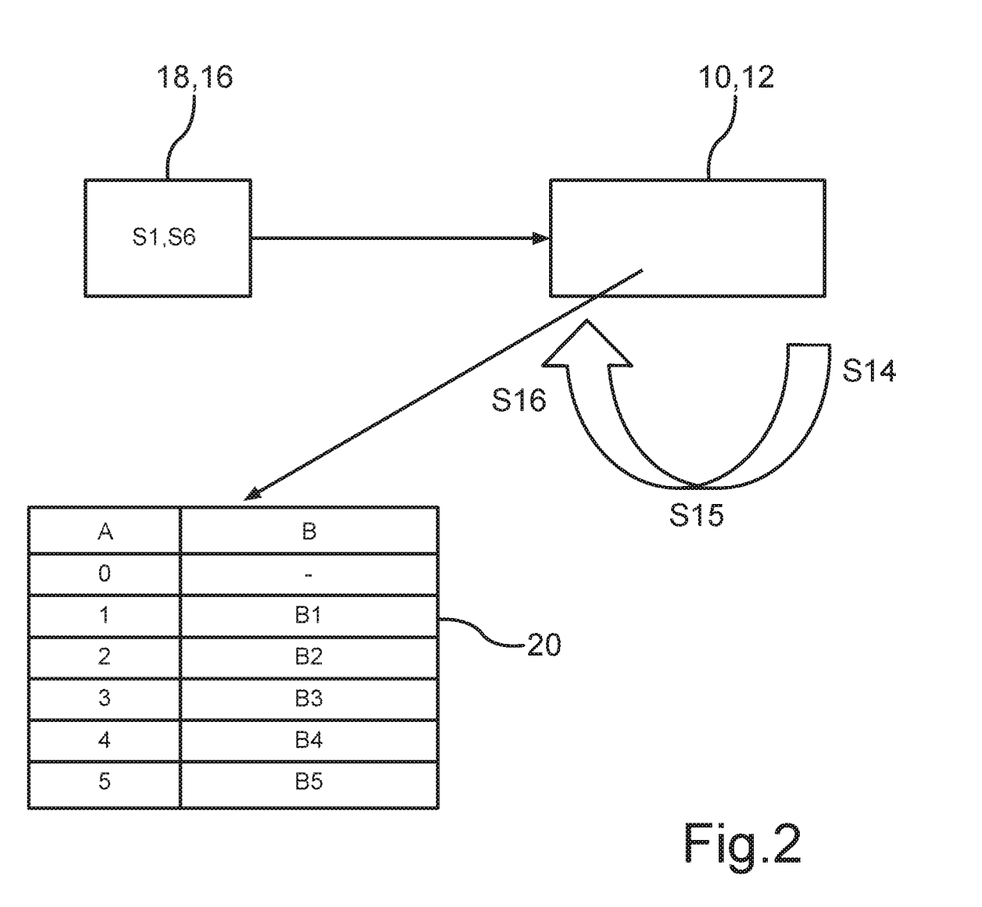
FIG. 2 illustrates a schematic view of another embodiment of the disclosed method.

FIG. 2 is a schematic view of another embodiment of the disclosed method.

Figure 3:
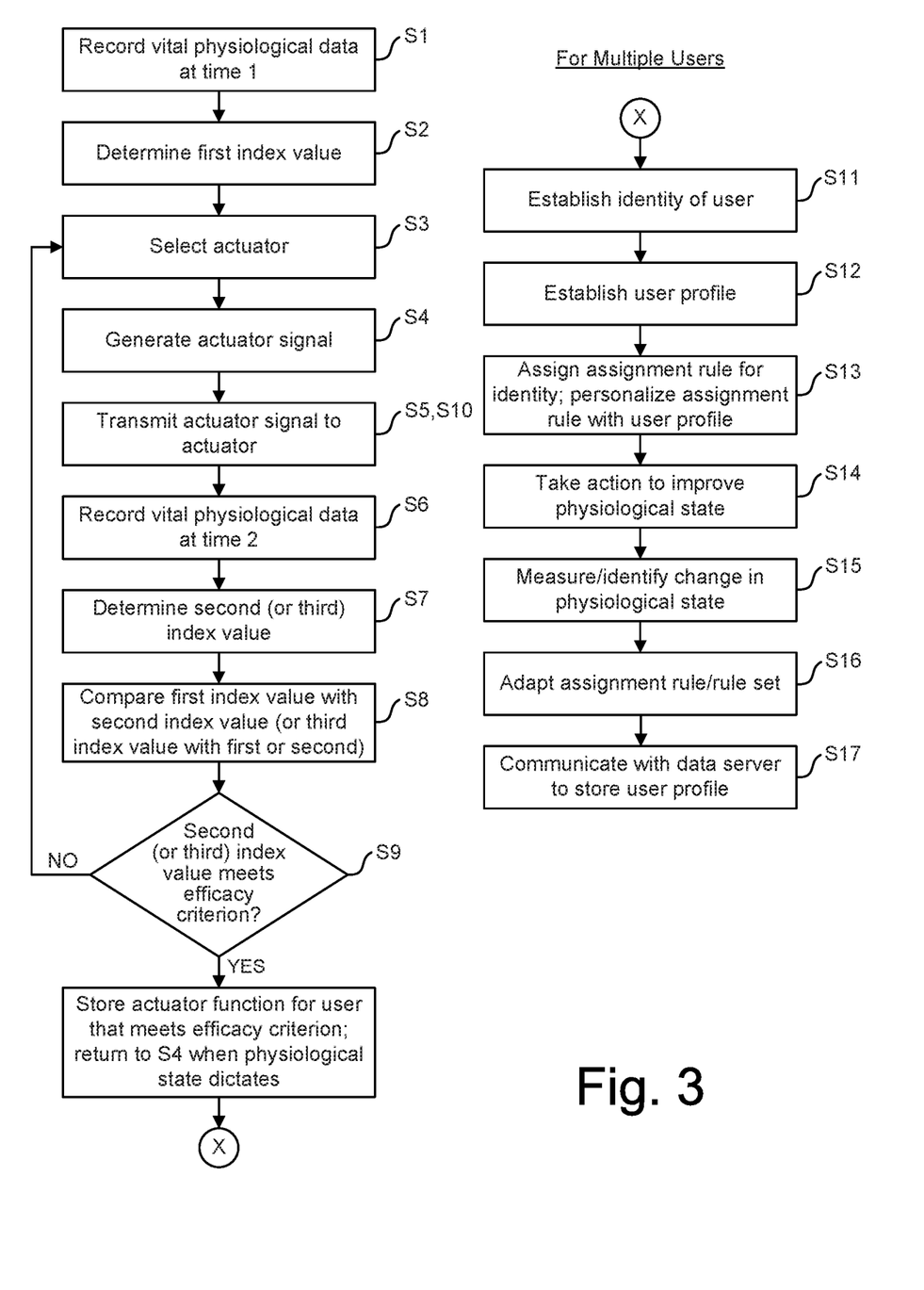
FIG. 3 illustrates a flow chart of steps S1-S17 of the disclosed method, according to some embodiments.

FIG. 3 is a flow chart of steps S1-S17 of the disclosed method, according to some embodiments. Steps S1-S17 are further referenced in the descriptions of FIGS. 1 and 2 below.

FIG. 1 is a schematic view of the principle of the disclosed method. For this purpose, FIG. 1 shows a motor vehicle 10, which can preferably be designed as a car, for example, a passenger car.

The motor vehicle 10 comprises a control device 12, which can optionally comprise a microchip 13 and/or a microcontroller chip 13. The control device 12 can be designed as a control board for a control device or as a control device, for example.

The motor vehicle 10 also comprises one or more actuators 14, whereby one actuator 14 is a drive element for converting electric signals and can be a motor vehicle seat having a massage function, an infotainment system for playing an audio file and/or for playing a predetermined music genre, or a lighting device of the motor vehicle 10, for example. In this case, a lighting device is understood to mean a device for adjusting and controlling the lighting in the motor vehicle 10. The lighting device can comprise lamps or luminaires for this purpose. In this case, the actuators 14 are connected to the control device 12, either wirelessly or via wires, by means of signal and/or data communication links 19. Such a signal and/or data communication link 19 can be designed as a WLAN connection or as part of a data bus system of the motor vehicle 10, for example.

The motor vehicle 10 can optionally comprise a sensor device 16, which is designed to record vital physiological data about the user (method steps S1 and S6). The vital physiological data describe values of the physiological parameters of the user, for example a heart rate, a pulse rate, and/or a breathing rate and/or an electrical conductivity between two points on the body. For this purpose, the sensor device 16 can comprise one or more sensors, for example, which may be integrated in a steering wheel of the motor vehicle 10, for example, such that, when the user uses the steering wheel, said sensors can be touched by the user's hands and can therefore measure the electrical conductivity between his two hands, for example.

The sensor device 16 can alternatively or additionally be designed as a sensor device 16 of the wearable accessory 18, i.e., as a sensor device 16 of a fitness belt, a wristband, a wristwatch, or a wearable piece of clothing, for example. If the vital physiological data are recorded by a wearable accessory 18 (S1, S6), this data can be transmitted to the control device 12 via a WLAN connection, for example. For this purpose, the wearable accessory 18 can comprise a transmitter (not shown in FIG. 1), for example, and the control device 12 can comprise a corresponding receiver.

According to method step S2, the control device 12 identifies a first index value (S2) of vital physiological data that has been recorded at a first point in time. Algorithms for determining such an index value from vital physiological data are known from the prior art to a person skilled in the art. The first index value describes a physiological state of the user, for example, a stress situation. In order to now alleviate this stress situation, the control device 12 selects a first actuator 14 from a plurality of actuators 14, for example, a motor vehicle component such as a motor vehicle seat having a massage function (S3), in accordance with a default setting by the manufacturer. In addition, the control device 12 generates a first actuator signal (S4), which describes the activation of the massage function, by way of example, and this first actuator signal is transmitted to the motor vehicle seat, by way of example (S5).

The massage function is generally used to increase the wellbeing of the user by loosening their back and/or shoulders. However, different users react in different ways to different types of influence, and therefore the user of the motor vehicle 10, by way of example, may, for example, not be used to such massage movements and this may not relax him as much as other users, for example. In method step S6, the sensor device 16 therefore records vital physiological data once again, this time at a second point in time that can preferably be after the first actuator function has been activated. In order to determine whether the massage function, by way of example, has served its purpose, in method step S7 the control device 12 identifies a second index value for the vital physiological data recoded at the second point in time. The two index values can now be compared (S8) and this comparison can be used by the control device 12 to deduce that the state of stress has considerably improved, for example. For the purpose of comparing the two index values (S8), the control device 12 can, for example, subtract a numerical value of one of the index values from a numerical value of the other index value or, using a digitally stored list, can assign one numerical value of one index value to a level for the state of stress in order to read the level for the physiological state. However, more complex identification steps are also conceivable, which can be formulated in a general algorithm on the basis of empirical values and experiences.

The result of the comparison is now used to determine (S9) whether the second index value meets an efficacy criterion, it being possible for the efficacy criterion to be stored in the control device 12 in the form of a numerical value, for example. For this purpose, the index value can have improved, for example, if it is outside a predefined tolerance. From this, it is possible to conclude whether or not the first actuator function has brought about a predetermined degree of improvement in the physiological state. If this is not the case, since the user instead reacts to the massage with discomfort and additional tension, for example, or his body does not react quickly to the massage, the control device 12 can select (S3) and activate (S10) a different actuator function, for example playing a specific music genre or piece of music by means of an infotainment system as the actuator 14.

For this purpose, the control device 12 can select a song from a music program that the user may have characterized as their favorite song or "power song," for example. In order to "learn" which actuator function is the most effective and/or most enjoyable for the current user, different actuator functions can be carried out, for example, until the control device 12 is able to determine an actuator function that may be particularly effective. On the basis of this knowledge, the control device 12 can compile a priority list, for example, or simply determine which actuator function is the most effective. An index value can be identified from each actuator function in this case (S7) and it is possible to determine whether or not this further index value meets the efficacy criterion (S9).

For a different user, a massage function may be very helpful, for example, and therefore the second index value may meet the efficacy criterion, for example. In such a case, the control device 12 can store and save information, for example, that can state that the efficacy criterion has been met by means of the massage function for this other user. If this other user then uses the motor vehicle again and if a state of stress is then re-established for this other user, the massage function can be activated from the outset (S4).

In order to individually gear a motor vehicle 10 to several users, the motor vehicle 10 can establish the identity of the user, for example, by means of the control device 12 (S1) and can provide this identity with an assignment rule 20 (S13). For such an assignment rule 20, which is shown in the form of a table in FIG. 2, for example, a plurality of index values or physiological states A can be assigned to each actuator 14 and/or actuator function B. For example, the table in FIG. 2 shows six different stress levels from zero to five for this purpose, each of which can be assigned to an actuator function B or a combination of a plurality of actuator functions B.

No actuator functions can be assigned to a stress level of zero (0), for example. An actuator function B1 can be assigned to a stress level of one (1), for example, which function may describe playing jazz music by an infotainment system, for example. An actuator function combination B2 can provide playing jazz music and setting a lighting effect for a stress level of two (2), for example, whilst an actuator function combination B3 can describe a combination of a lighting effect and the activation of a massage seat for a stress level of three (3). If the control device 12 identifies a stress level of four (4), which can be a very high stress level, for example, a combination of actuators 14 may be provided that can provide playing jazz music, a lighting effect, and turning on the massage function. If the user is in a very high, level-five (5) state of stress, a stop recommendation can be given by means of the infotainment system, for example, as actuator function B5.

In other words, the example of the assignment rule 20 in FIG. 2 describes that a plurality of actuator functions B can also be carried out at the same time by one actuator signal.

FIG. 2 therefore once again shows, by way of example, the course of a control loop or "machine learning model," for example, for a stressed user, whereby a wearable accessory 18 records vital physiological data (S1, S6) and, by means of the control device 12, the motor vehicle 10 can assume a stress level of zero (0), for example, by initially following a default setting of a control loop, and cannot actuate an actuator function B. The method step S14 can involve taking action to improve the physiological state A. In method step S15, the change in the physiological state is measured or identified. The assignment rules for a rule set are adapted in method step S16.

The assignment rule 20 (S13), which can also be referred to as a rule set, can be personalized using a user profile (S12), for example, which can be stored in a data server 22 that is located outside of the motor vehicle, for example. For this purpose, the control device 12 can comprise a communication module for establishing an internet connection, for example. Communication S17 with the data server 22 that is located outside of the motor vehicle can then take place via the internet connection, by way of example. For this purpose, the user can, for example, log into his user profile by means of a touch-sensitive screen of an infotainment system, for example.

FIG. 1 likewise shows a mobile terminal device 24, which can be designed as a Smartphone or a tablet computer or a laptop, for example. The mobile terminal device 24 can comprise a storage medium 26, for example a storage chip or a hard drive, on which there is a program code which, when executed by a control device 12 of the mobile terminal device 24, is designed to carry out the method steps according to one of the embodiments of the example that relate to a control device 12. For the sake of clarity, in this case the signal and/or data communication links 19 to the sensor device 16 and the actuators 14 are not shown. Such a storage medium 26 can alternatively be a component of the control device 12 of the motor vehicle 10.

Determining the index values (S2, S7) and/or other method steps relating to the control device 12 can alternatively be carried out by the mobile terminal device 24, for example, which may comprise a corresponding application ("App"), for example, for this purpose.

The assignment rule 20 can optionally be forwarded to another motor vehicle 10 if the user buys a new car, for example. For this purpose, a back-up of the old motor vehicle 10 can be made on a regular basis, for example, the assignment rule 20 being storable in the customer profile, for example, and therefore on the data server 22 that is located outside of the motor vehicle. If the user buys a new motor vehicle 10, the assignment rule 20 stored in the old vehicle can be input into the control device 12 of the new motor vehicle 10, for example.

The above-mentioned embodiments illustrate the principle of learning personalized stress feedback. According to another embodiment, the method can be integrated in the motor vehicle 10 in the form of a statistical method, for example, which can measure how effectively the individual measures, i.e., the individual actuator functions B, improve a physiological state A, i.e., reduce stress, for example. As a result, customer-specific and individual actuator functions for reducing stress, by way of example, can be selected in order to achieve the best result for the user.

For example, it may be assumed that jazz music relaxes a user and reduces his stress level, for example. However, the disclosed method makes it possible to learn, for example, that this measure does not work for the user of this motor vehicle 10. Following this, it is possible to try a different method, i.e., a different actuator function can be activated, for example, rock music or special songs from the user's playlists. The system is therefore able to perceive if this change has reduced stress more effectively and can memorize this, for example.

In other words, the methods of reducing the user's stress are individualized on the basis of statistical learning methods.

This advantageously reduces stress, by way example, more effectively and therefore provides better customer satisfaction.

According to another embodiment, a wearable accessory 18 can convey the current stress level of a driver (S1, S6), for example. If stress is identified (S2), the motor vehicle 10 can carry out the default measure for reducing stress, i.e., by means of functions according to a default setting. The efficacy of the measures can then be measured on the basis of the change in stress level (S9). The rules can then be adapted and specifically optimized to the user.

The invention claimed is:

1. A method for operating a motor vehicle, the method comprising:
   determining, by a control device, a first index value from vital physiological data that is recorded by a sensor device at a first point in time, the vital physiological data being received from the sensor device and the vital physiological data describing a physiological parameter relating to a user of the motor vehicle;
   selecting, by the control device, a first actuator of the motor vehicle from a plurality of actuators based on the first index value;

generating, by the control device, a first actuator signal that describes an activation of a first actuator function that is to be carried out by the first actuator;

transmitting, by the control device, the first actuator signal to the first actuator, activating the first actuator function based at least in part on the first actuator signal, the first actuator function being activated after the first point in time;

recording vital physiological data about the user at a second point in time after the first actuator function has been activated;

determining, by the control device, a second index value from the vital physiological data recorded by the sensor device at the second point in time;

comparing, by the control device, the first index value and the second index value to provide a result of the comparing that describes a physiological state of the user;

determining, by the control device, using the result of the comparing, whether the second index value meets an efficacy criterion describing a preset degree of improvement in the physiological state of the user brought about by the activated first actuator function;

when the second index value meets the efficacy criterion, assigning the first actuator function to the first index value as part of an assignment rule mapping physiological states to actuator functions for the user; and activating, the first actuator function based at least in part on the assignment rule when the first index value is subsequently determined.

2. The method of claim 1, further comprising:
if the second index value does not meet the efficacy criterion,
  selecting, by the control device, a second actuator function of a corresponding actuator comprising the first actuator or a different actuator of the motor vehicle;
  generating, by the control device, a second actuator signal that describes an activation of the second actuator function selected;
  transmitting, by the control device, the second actuator signal to the corresponding actuator;
  determining, by the control device, a third index value from the vital physiological data that is recorded at a third point in time; and
  using the third index value and at least one of the first index value and the second index value, determining, by the control device, whether the third index value meets the efficacy criterion or whether the second actuator function brings about a greater degree of improvement than the first actuator function; and
if the second actuator function brings about the greater degree of improvement,
  activating, by the control device, the second actuator function once an additional index value that describes the physiological state of the user has been identified.

3. The method of claim 2, wherein the selecting of the second actuator function comprises selecting an actuator action from one of: activating a massage function via a motor vehicle seat, playing an audio file, playing a preset music genre, setting lighting via a lighting device of the motor vehicle, and displaying a stop recommendation via a screen of the motor vehicle.

4. The method of claim 1, further comprising:
establishing, by the control device, an identity of the user;

providing, by the control device, an assignment rule by assigning a plurality of actuator functions to one physiological state for the user; and personalizing, by the control device, the assignment rule based on the identity of the user established.

5. The method of claim 4, wherein the establishing of the identity of the user comprises identifying the identity of the user based on a user profile that is stored on a data server that is located outside of the motor vehicle.

6. The method of claim 1, wherein the sensor device is configured as a sensor device of a wearable accessory, which is configured to be worn on a body of the user.

7. The method of claim 1, wherein the selecting of the first actuator function comprises selecting an actuator action from one of: activating a massage function via a motor vehicle seat, playing an audio file, playing a preset music genre, setting lighting via a lighting device of the motor vehicle, and displaying a stop recommendation via a screen of the motor vehicle.

8. A control device, comprising:
a microcontroller or a microchip, having at least one processor, wherein the at least one processor is configured to:
  determine a first index value from vital physiological data that is recorded by a sensor device at a first point in time, the vital physiological data being received from the sensor device and the vital physiological data describing a physiological parameter relating to a user of a motor vehicle;
  select a first actuator of the motor vehicle from a plurality of actuators based on the first index value;
  generate a first actuator signal that describes an activation of a first actuator function that is to be carried out by the first actuator;
  transmit the first actuator signal to the first actuator, wherein the first actuator activates the first actuator function in response to receiving the first actuator signal and after the first point in time, and wherein, the sensor device records vital physiological data about the user at a second point in time after the first actuator function has been activated by the first actuator;
  determine a second index value from the vital physiological data recorded by the sensor device at the second point in time;
  compare the first index value and the second index value to provide a result of the comparing that describes a physiological state of the user;
  determine, using the result of the comparing, whether the second index value meets an efficacy criterion describing a preset degree of improvement in the physiological state of the user brought about by the activated first actuator function;
  when the second index value meets the efficacy criterion, map the first actuator function to the first index value as part of an assignment rule mapping physiological states to actuator functions for the user; and
  activate the first actuator function based at least in part on the assignment rule when the first index value is subsequently determined.

9. The control device of claim 8, wherein the at least one processor is further configured to:
if the second index value does not meet the efficacy criterion,
  select a second actuator function of a corresponding actuator comprising the first actuator or a different actuator of the motor vehicle;

generate a second actuator signal that describes an activation of the second actuator function selected;
transmit the second actuator signal to the corresponding actuator;
determine a third index value from the vital physiological data that is recorded at a third point in time; and
using the third index value and at least one of the first index value and the second index value, determine whether the third index value meets the efficacy criterion or whether the second actuator function brings about a greater degree of improvement than the first actuator function; and
if the second actuator function brings about the greater degree of improvement,
activate the second actuator function once an additional index value that describes the physiological state of the user has been identified.

10. The control device of claim 8, wherein the at least one processor is further configured to:
establish an identity of the user;
provide an assignment rule by assigning a plurality of actuator functions to one physiological state for the user; and
personalize the assignment rule based on the identity of the user established.

11. A motor vehicle, comprising:
a control device comprising a microcontroller or a microchip, having at least one processor, wherein the at least one processor is configured to:
determine a first index value from vital physiological data that is recorded by a sensor device at a first point in time, the vital physiological data being received from the sensor device and the vital physiological data describing a physiological parameter relating to a user of the motor vehicle;
select a first actuator of the motor vehicle from a plurality of actuators based on the first index value;
generate a first actuator signal that describes an activation of a first actuator function that is to be carried out by the first actuator;
transmit the first actuator signal to the first actuator, wherein the first actuator activates the first actuator function in response to receiving the first actuator signal and after the first point in time, and wherein the sensor device records vital physiological data about the user at a second point in time after the first actuator function has been activated by the first actuator;
determine a second index value from the vital physiological data recorded by the sensor device at the second point in time;
compare the first index value and the second index value to provide a result of the comparing that describes a physiological state of the user;
determine, using the result of the comparing, whether the second index value meets an efficacy criterion describing a preset degree of improvement in the physiological state of the user brought about by the activated first actuator function;
when the second index value meets the efficacy criterion, map the first actuator function to the first index value; and
activate the first actuator function based at least in part on the assigning when the first index value is subsequently determined.

12. The motor vehicle of claim 11, wherein the at least one processor is further configured to:
if the second index value does not meet the efficacy criterion,
select a second actuator function of a corresponding actuator comprising the first actuator or a different actuator of the motor vehicle;
generate a second actuator signal that describes an activation of the second actuator function selected;
transmit the second actuator signal to the corresponding actuator;
determine a third index value from the vital physiological data that is recorded at a third point in time; and
using the third index value and at least one of the first index value and the second index value, determine whether the third index value meets the efficacy criterion or whether the second actuator function brings about a greater degree of improvement than the first actuator function; and
if the second actuator function brings about the greater degree of improvement,
activate the second actuator function once an additional index value that describes the physiological state of the user has been identified.

13. The motor vehicle of claim 12, wherein, for the selecting of the second actuator function, the at least one processor is further configured to select an actuator action from one of: activating a massage function via a motor vehicle seat, playing an audio file, playing a preset music genre, setting lighting via a lighting device of the motor vehicle, and displaying a stop recommendation via a screen of the motor vehicle.

14. The motor vehicle of claim 11, wherein the at least one processor is further configured to:
establish an identity of the user based on a user profile;
provide an assignment rule by assigning a plurality of actuator functions to one physiological state for the user; and
personalize the assignment rule based on the identity of the user established.

15. The motor vehicle of claim 11, wherein, for the selecting of the first actuator function, the at least one processor is further configured to select an actuator action from one of: activating a massage function via a motor vehicle seat, playing an audio file, playing a preset music genre, setting lighting via a lighting device of the motor vehicle, and displaying a stop recommendation via a screen of the motor vehicle.

16. A tangible computer-readable device having a storage medium, the storage medium storing a program code with instructions that, when executed by a control device, cause the control device to perform operations comprising:
determining a first index value from vital physiological data that is recorded by a sensor device at a first point in time, the vital physiological data being received from the sensor device and the vital physiological data describing a physiological parameter relating to a user of a motor vehicle;
selecting a first actuator of the motor vehicle from a plurality of actuators based on the first index value;
generating a first actuator signal that describes an activation of a first actuator function that is to be carried out by the first actuator;
transmitting the first actuator signal to the first actuator, wherein the first actuator activates the first actuator function in response to receiving the first actuator signal and after the first point in time, and wherein the sensor device records vital physiological data about the user at a second point in time after the first actuator function has been activated by the first actuator;

determining a second index value from the vital physiological data recorded by the sensor device at the second point in time;

comparing the first index value and the second index value to provide a result of the comparing that describes a physiological state of the user;

determining, using the result of the comparing, whether the second index value meets an efficacy criterion describing a preset degree of improvement in the physiological state of the user brought about by the activated first actuator function;

when the second index value meets the efficacy criterion, assigning the first actuator function to the first index value; and activating the first actuator function based at least in part on the assigning when the first index value is subsequently determined.

17. The computer-readable device of claim 16, the operations performed by the control device further comprising:
if the second index value does not meet the efficacy criterion,
selecting a second actuator function of a corresponding actuator comprising the first actuator or a different actuator of the motor vehicle;
generating a second actuator signal that describes an activation of the second actuator function selected;
transmitting the second actuator signal to the corresponding actuator;
determining a third index value from the vital physiological data that is recorded at a third point in time; and
using the third index value and at least one of the first index value and the second index value, determining whether the third index value meets the efficacy criterion or whether the second actuator function brings about a greater degree of improvement than the first actuator function; and
if the second actuator function brings about the greater degree of improvement,
activating the second actuator function once an additional index value that describes the physiological state of the user has been identified.

18. The computer-readable device of claim 16, the operations performed by the control device further comprising:
establishing an identity of the user;
providing an assignment rule by assigning a plurality of actuator functions to one physiological state for the user; and
personalizing the assignment rule based on the identity of the user established.

19. A mobile terminal device comprising a storage medium, the storage medium storing a program code with instructions that, when executed by a control device, cause the control device to perform operations comprising:
determining a first index value from vital physiological data that is recorded by a sensor device at a first point in time, the vital physiological data being received from the sensor device and the vital physiological data describing a physiological parameter relating to a user of a motor vehicle;

selecting a first actuator of the motor vehicle from a plurality of actuators based on the first index value;

generating a first actuator signal that describes an activation of a first actuator function that is to be carried out by the first actuator;

transmitting the first actuator signal to the first actuator, wherein the first actuator activates the first actuator function in response to receiving the first actuator signal and after the first point in time, and wherein the sensor device records vital physiological data about the user at a second point in time after the first actuator function has been activated by the first actuator;

determining a second index value from the vital physiological data recorded by the sensor device at the second point in time;

comparing the first index value and the second index value to provide a result of the comparing that describes a physiological state of the user;

determining, using the result of the comparing, whether the second index value meets an efficacy criterion describing a preset degree of improvement in the physiological state of the user brought about by the activated first actuator function;

when the second index value meets the efficacy criterion, assigning the first actuator function to the first index value; and activating the first actuator function based at least in part on the assigning when the first index value is subsequently determined.

20. The mobile terminal device of claim 19, the operations performed by the control device further comprising:
if the second index value does not meet the efficacy criterion,
selecting a second actuator function of a corresponding actuator comprising the first actuator or a different actuator of the motor vehicle;
generating a second actuator signal that describes an activation of the second actuator function selected;
transmitting the second actuator signal to the corresponding actuator;
determining a third index value from the vital physiological data that is recorded at a third point in time; and
using the third index value and at least one of the first index value and the second index value, determining whether the third index value meets the efficacy criterion or whether the second actuator function brings about a greater degree of improvement than the first actuator function; and
if the second actuator function brings about the greater degree of improvement,
activating the second actuator function once an additional index value that describes the physiological state of the user has been identified.

21. The mobile terminal device of claim 19, the operations performed by the control device further comprising:
establishing an identity of the user;
providing an assignment rule by assigning a plurality of actuator functions to one physiological state for the user; and
personalizing the assignment rule based on the identity of the user established.

* * * * *